G. A. Huggins,

Milk Can.

No. 3,657. Reissued Sept. 28, 1869.

Witnesses:

Emm James

John D. Bloor

Inventor

George A. Huggins per Holmead & Hollingshead

Attorneys

N. PETERS, PHOTO-LITHOGRAPHER, WASHINGTON, D. C.

UNITED STATES PATENT OFFICE.

H. W. SHEPARD, (ASSIGNEE OF GEORGE A. HUGGINS,) OF MANNSVILLE, NEW YORK.

IMPROVEMENT IN MILK-CANS.

Specification forming part of Letters Patent No. 79,907, dated July 14, 1868; Reissue No. 3,657, dated September 28, 1869.

*To all whom it may concern:*

Be it known that GEORGE A. HUGGINS, of Mannsville, in the county of Jefferson and State of New York, invented certain new and useful Improvements in Milk-Cans, on which Letters Patent of the United States were granted bearing date July 14, 1868, and numbered 79,907; that the said Letters Patent have been assigned to me, H. W. SHEPARD, of Mannsville, in the county of Jefferson and State of New York; and that the following is a full, clear, and exact description of said invention, reference being had to the accompanying drawings, and to the letters of reference marked thereon, making part of this specification, in which—

Figure 1:
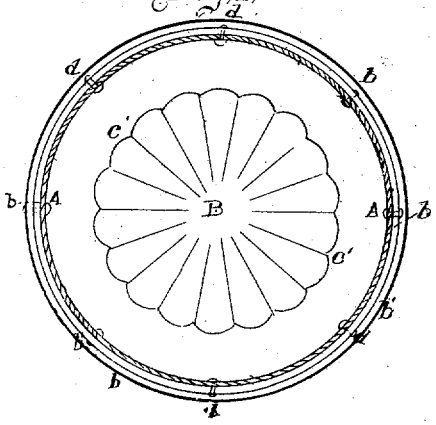
Figure 2:
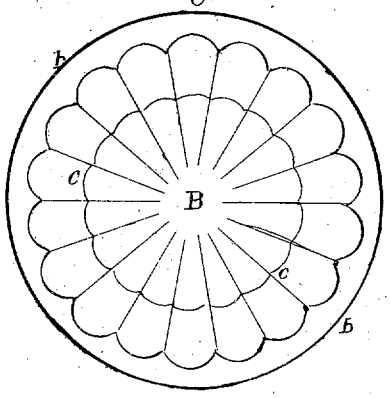
Figure 3:
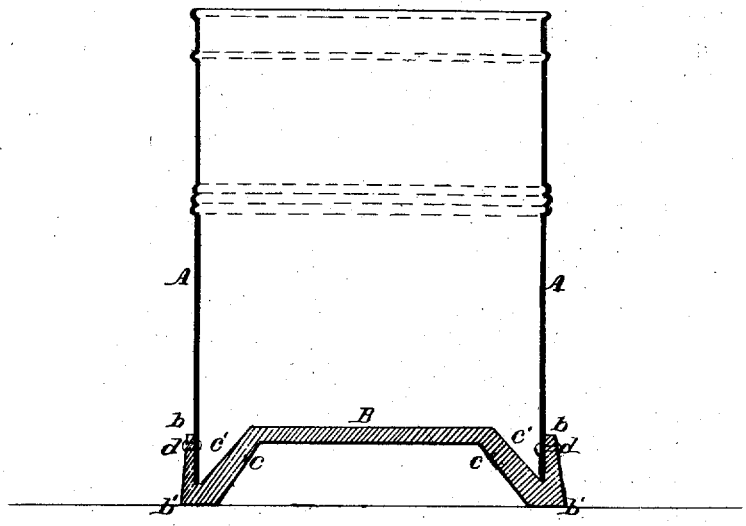

Figure 1 is a view of the bottom piece on the inside. Fig. 2 is a view of the bottom piece on the outside. Fig. 3 is a vertical section through the middle.

The object of this invention is to provide solid metallic bottoms for milk-cans and such cans as are used for various liquids which are to be handled very frequently, and are used principally in conveying milk from the dairy ticular, as the cans may be used for conveying to the market, but is not confined to that par- and containing oils and other liquids.

In the usual method of constructing milk-cans the bottoms are of the same material as the sides, and which for economy are of tin. The lower hoops are made strong; but as these cans are subjected to rough handling they soon become so much damaged as to be constantly in a leaky condition, which causes much loss, and is besides the constant source of expense and annoyance in repairs.

In this invention solid bottoms are provided, which are of one piece, and may be either cast, wrought, or stamped out, and by the peculiar shape the weight of the can is so arranged that the center of gravity is placed very low, and the risk of turning over is much lessened, if not entirely obviated. The metal bottom is made as represented in the section, Fig. 3, so that the tin cylinder which is to be the can is just the size of the interior of the rim, and when put in and well soldered is then riveted to it by any number of rivets, which should be about one-third of the distance down from the top of the rim, as at *d*. The inside should be soldered also, and when thus fixed no amount of rough handling can possibly jar the soldering apart, as the rivets keep the two metals firmly together. The bottom being made hollow underneath, and the base at *b'* being considerably larger than the top of the rim at *b*, gives more stability to the whole can, and the weight of the bottom piece being so much more than the upper cylinder it will require extraordinary force to overturn it.

To enable others skilled in the art to make and use the invention, its construction and operation will be described.

A is the side of the can; B, the bottom piece, and is either cast, wrought, or stamped out; *b*, the top of the rim; *b'*, the bottom of the rim; *c*, the recess on the under side, which may be plain, corrugated, or fluted; *c'*, the recess on the upper side or inside of the can, having corresponding flutings or corrugations; *d*, the rivets to hold the cylinder to the bottom piece. It will be observed that this arrangement of groove in the bottom enables one by means of rivets and solder to securely attach the same to the body of the can, entirely dispensing with the outer auxiliary hoop now generally used.

Having thus fully described the invention, what is claimed therein as new, and desired to be secured by Letters Patent of the United States, is—

A can consisting of the sheet-metal cylinder A and metal bottom B, the latter being provided with a recess, *c*, groove *c'*, and inclined sides *b b'*, as set forth.

In testimony whereof I have signed my name to this specification before two subscribing witnesses.

H. W. SHEPARD.

Witnesses:

A. L. BOUNDS,

JOHN J. HINMAN.